United States Patent
Downey

(10) Patent No.: US 8,964,969 B2
(45) Date of Patent: Feb. 24, 2015

(54) TELECOMMUNCIATIONS FILTER DEVICE

(75) Inventor: Simon Nicholas Downey, Suffolk (GB)

(73) Assignee: British Telecommunications Public Limited Company, London (GB)

( * ) Notice: Subject to any disclaimer, the term of this patent is extended or adjusted under 35 U.S.C. 154(b) by 128 days.

(21) Appl. No.: 13/262,473

(22) PCT Filed: Mar. 11, 2010

(86) PCT No.: PCT/GB2010/000443
§ 371 (c)(1),
(2), (4) Date: Sep. 30, 2011

(87) PCT Pub. No.: WO2010/112804
PCT Pub. Date: Oct. 7, 2010

(65) Prior Publication Data
US 2012/0027187 A1 Feb. 2, 2012

(30) Foreign Application Priority Data
Mar. 31, 2009 (EP) ..................................... 09250966

(51) Int. Cl.
*H04M 9/00* (2006.01)
*H04M 11/06* (2006.01)
*H04Q 1/02* (2006.01)

(52) U.S. Cl.
CPC ............. *H04M 11/066* (2013.01); *H04Q 1/028* (2013.01)
USPC .................................................... 379/413.02

(58) Field of Classification Search
USPC ......... 379/413.02, 377, 93.09, 419, 400, 458, 379/201, 271, 468, 464
See application file for complete search history.

(56) References Cited

U.S. PATENT DOCUMENTS

| 6,449,362 B1 * | 9/2002 | Tennyson et al. ......... 379/413.02 |
| 6,975,620 B2 * | 12/2005 | Corvino et al. ................ 370/352 |
| 8,422,662 B2 * | 4/2013 | Reed et al. ................ 379/399.01 |

FOREIGN PATENT DOCUMENTS

| FR | 2 896 935 A1 | 8/2007 |
| GB | 2 414 359 A | 11/2005 |

OTHER PUBLICATIONS

International Search Report for International Application No. PCT/GB2010/000443 filed Mar. 11, 2010, mailed May 11, 2010, 2 pages.
Written Opinion of the International Searching Authority for International Application No. PCT/GB2010/000443 filed Mar. 11, 2010, mailed May 11, 2010, 5 pages.

* cited by examiner

*Primary Examiner* — Maria El-Zoobi
(74) *Attorney, Agent, or Firm* — Patterson Thuente Pedersen, P.A.

(57) ABSTRACT

Embodiments relate to a filtering device that filters a telecommunications signal and outputs to a telephone and a data port depending on whether a data plug has been inserted into the data port. A micro switch at the data port is activated and brings filtering components in-line when a data plug is inserted, and the filtering components filter the combined telecommunications signal and outputs filtered telephony only signals to the telephone port, and data only signals to the data port. When no data plug is present in the data port, the micro switch is not activated, and the filter is bypassed, thereby presenting unfiltered telephone and data signals to the telephone port as well as any extension sockets connected thereto, but no signals to the data port.

8 Claims, 3 Drawing Sheets

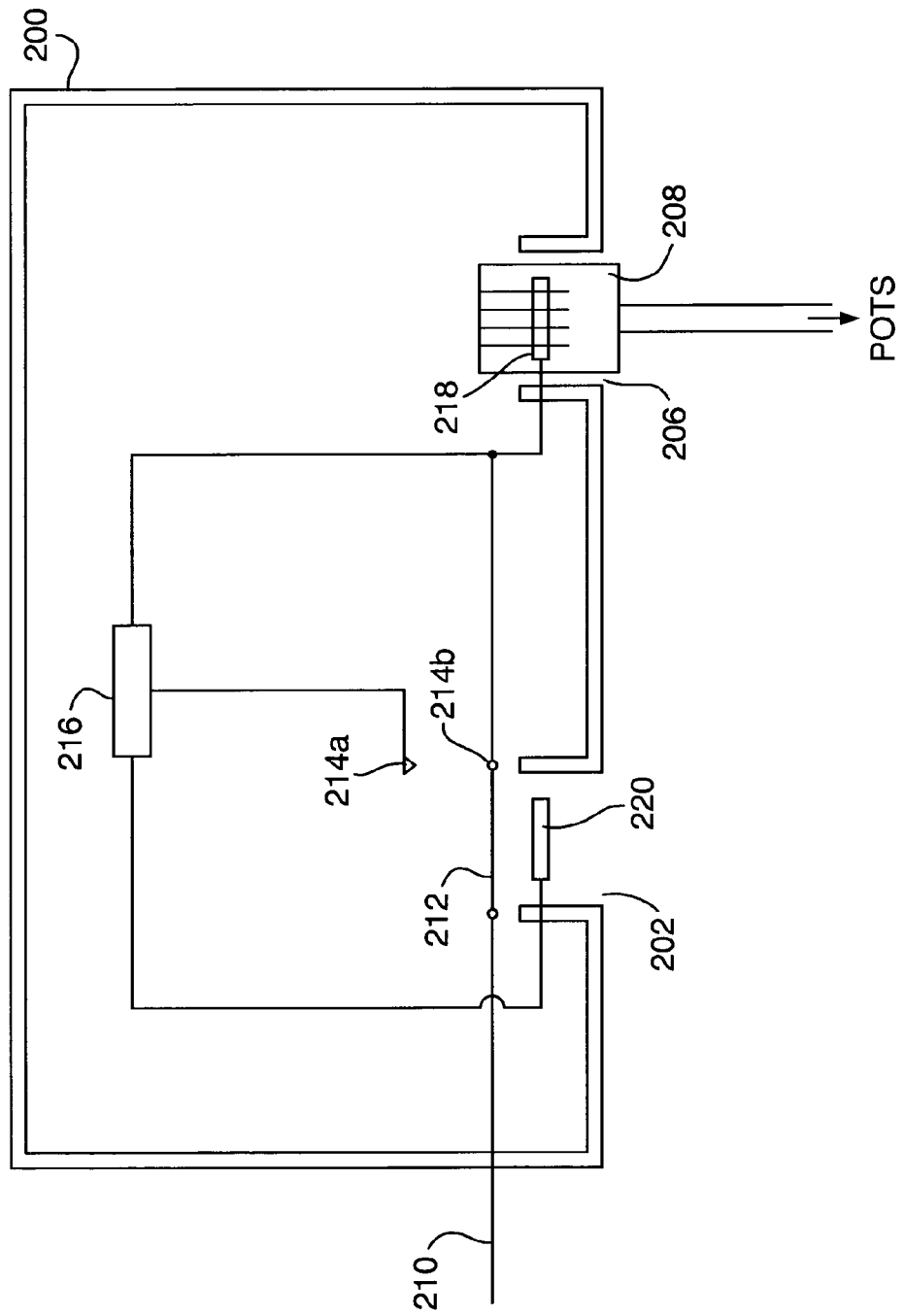

the DSL signal from the POTS signal before the signal is presented to the extension wiring. The effect is particularly important for higher-frequency DSL, such as VDSL2, where the exclusion of such an SSFP can severely degrade the broadband service.

TELEMMUNCIATIONS FILTER DEVICE

RELATED APPLICATIONS

The present application is a National Phase entry of PCT Application No. PCT/GB2010/000443, filed Mar. 11, 2010, which claims priority from European Patent Application No. 09250966.0, filed Mar. 31, 2009, the disclosures of which are hereby incorporated by reference herein in their entireties.

TECHNICAL FIELD

This invention relates to a telecommunications filter device, in particular a telecommunications filter device that switches in a filter to a telephony output in dependence on whether a connector is presented to a data port.

BACKGROUND

Traditional telephone sockets within home premises typically comprise a "master socket" and a number of extension sockets. Historically, the master socket is the point of demarcation for telephone services, which is to say that any wiring from the exchange up to and including the master socket is the domain of the service provider and any wiring beyond the master socket, including extension wiring, is the domain of the customer. In the UK, the master socket is typically a "NTE5" unit, where NTE is short for "network terminating equipment". The NTE5 master socket allows a customer to easily add their own extension wiring within his premises, and also allows easy isolation of the main line from the extension wiring by removal of the front faceplate.

Digital Subscriber Line (DSL) technologies provide fast data connections, for example for broadband Internet access, over standard copper telephone lines. DSL utilizes transmission frequencies that are at a much higher frequency than those used for voice calls ("POTS"—plain old telephone service) on the copper lines. For example, the frequency band used in ADSL starts from about 25 kHz and finishes at just over 1000 kHz. In comparison, the frequency band for POTS stops at around 4 kHz. Whilst these frequencies are distinct from each other, interference can occur between POTS devices, such as telephones and fax machines, and DSL devices. As a result, filters are used to isolate the POTS signal from interference from DSL signals. The filters also provide isolation for the DSL transmissions from the POTS signals caused by transients generated during POTS signaling (e.g. dialing, ringing, off-hook etc).

Thus, the combined DSL and POTS telephone signal is low-pass filtered using what is usually referred to as a "microfilter", so that voice frequencies (up to around 41 KHz) can pass through unaltered to a POTS output, but higher frequencies associated with DSL are filtered out. The combined signal is usually split by the process of filtering, so that there are usually two outputs: one filtered for POTS and one unfiltered for DSL.

ADSL microfilters are often installed as and when they are needed between a master or extension socket and any connected POTS device requiring isolation. However, there also exist specially adapted faceplates for master and extension socket NTE5 devices that incorporate a microfilter, which has both a filtered POTS connection (a standard phone connector socket) as well as an unfiltered data port for DSL connection (typically an RJ-11 connector socket for connection to a DSL modem). These special faceplates are usually referred to as "service specific front plate" or SSFP for short. SSFP devices can often provide enhanced broadband service by isolating SSFPs are also used in other DSL installations, such as VDSL and VDSL2, which provide even faster data connections than ADSL. A VDSL2 SSFP will also separate out the voice telephony signals from the VDSL2 data signals. This is achieved through the use of band-pass or band-stop filters. The VDSL2 SSFP is designed such that the telephony signals will be filtered and provided at a telephony port and/or physically routed to any extension wiring; whilst unfiltered signals are presented at an extra data port exposed on the VDSL2 SSFP, to which a VDSL2 modem can be connected. FIG. 1 shows an example of a VDSL SSFP 100, with a filtered telephony port 102 and an unfiltered data port 104.

Whilst there are advantages to having a SSFP for VDSL2 (convenient data port, no need to use separate microfilters, improved signal isolation, etc), its installation also means that that an xDSL modem can no longer be connected to the POTS extension wiring, which has now been deliberately filtered to exclude high frequencies to overcome the issues highlighted above.

Therefore, if a premises is converted back to xDSL, such as ADSL, broadband connectivity (for example a new customer moving into the premises), then any xDSL modem will only work when connected to the additional data port 104 on the VDSL2 SSFP 100. This can cause a great deal of confusion for the new customer who will only be familiar with connecting his ADSL modem/router to the telephony port on a master/extension socket through a microfilter. The result would be numerous calls to the service providers helpdesk (which may or may not have knowledge of the presence of the VDSL2 SSFP), and may require an engineer visit to resolve who may remove the VDSL2 SSFP.

Additionally, it is known that whilst a SSFP will enable the provision of a better broadband service, a customer may be prepared to accept a lower broadband service, in exchange for the flexibility of connecting his VDSL2 modem to an extension socket. This is not possible with the SSFP design—for this configuration, a "data extension" cable must be run (perhaps physically alongside existing telephone extension wiring) to the preferred location of the VDSL2 modem. This can cause an unacceptable installation and management experience for the customer.

SUMMARY

Embodiments address one or more of the above-stated problems, and provide an improved service specific front plate for incorporating a filter providing both data and telephony services.

In an embodiment, a telecommunications filter device for filtering a telecommunications signal comprises telephony signals and data signals, the device comprising: a data signal port; a telephony signal output; and a switch adapted to operate in a first mode and a second mode, the first mode activated when a data plug is presented to the data signal port, and the second mode activated when no data plug is presented to the data signal port; wherein, in the first mode the telecommunications signal is filtered to output filtered telephony signals to the telephony signal output, and in a second mode the telecommunications signal is not filtered and both telephony and data signals are output to the telephony port.

The device can typically include a telephony port for telephony connectors, and the telephony signal output of the device is thus connected to the telephony port. The result, externally, is a terminal unit having a data port and a telephony port for corresponding data and phone connectors.

In some examples, the telephony signal output is connected to at least one telephone extension socket, either in lieu of or as well as any telephony port on the device.

In the first mode, the telecommunications signal can be filtered by a low pass filter between the switch and the telephone signal output.

In one embodiment, the data signals comprise xDSL signals, and the telephony signals comprise voice band signals. Further, the data signals can be transmitted at a higher frequency than the telephony signals.

Embodiments effectively re-grade the telephone port when no data plug is used, so that a customer can easily use previous xDSL microliters and similar equipment on the telephone port, which will provide both telephony and data signals. Thus, there is no need to remove the adapted faceplate to convert a premises back to ADSL.

Furthermore, as all extension phone ports can be delivered unfiltered with both data and telephony signals, a customer can get a data connection at any phone extension socket, and thus place their modem at a location of their choosing near an extension socket instead. Previously, as all the phone extension sockets were filtered with a standard SSFP, those extension sockets would not be carrying any data signals.

BRIEF DESCRIPTION OF THE DRAWINGS

For a better understanding of the present invention reference will now be made by way of example only to the accompanying drawings, in which:

FIG. 3 is a schematic illustrating an embodiment of the present invention in a second mode of operation.

DETAILED DESCRIPTION

Embodiments are described herein with reference to particular examples. The invention is not, however, limited to such examples.

In embodiments there is proposed a filtering device that filters a telecommunications signal and outputs to a telephone and a data port depending on whether a data plug has been inserted into the data port. The filtering device is an adapted VDSL2 service specific front plate of sorts. A micro switch at the data port is activated and brings filtering components in-line when a data plug is inserted, and the filtering components filter the combined telecommunications signal and outputs filtered telephony only signals to the telephone port, and data only signals to the data port. When no data plug is present in the data port, the micro switch is not activated, and the filter is bypassed, thereby presenting unfiltered telephone and data signals to the telephone port as well as any extension sockets connected thereto, but no signals to the data port.

Figure 2:
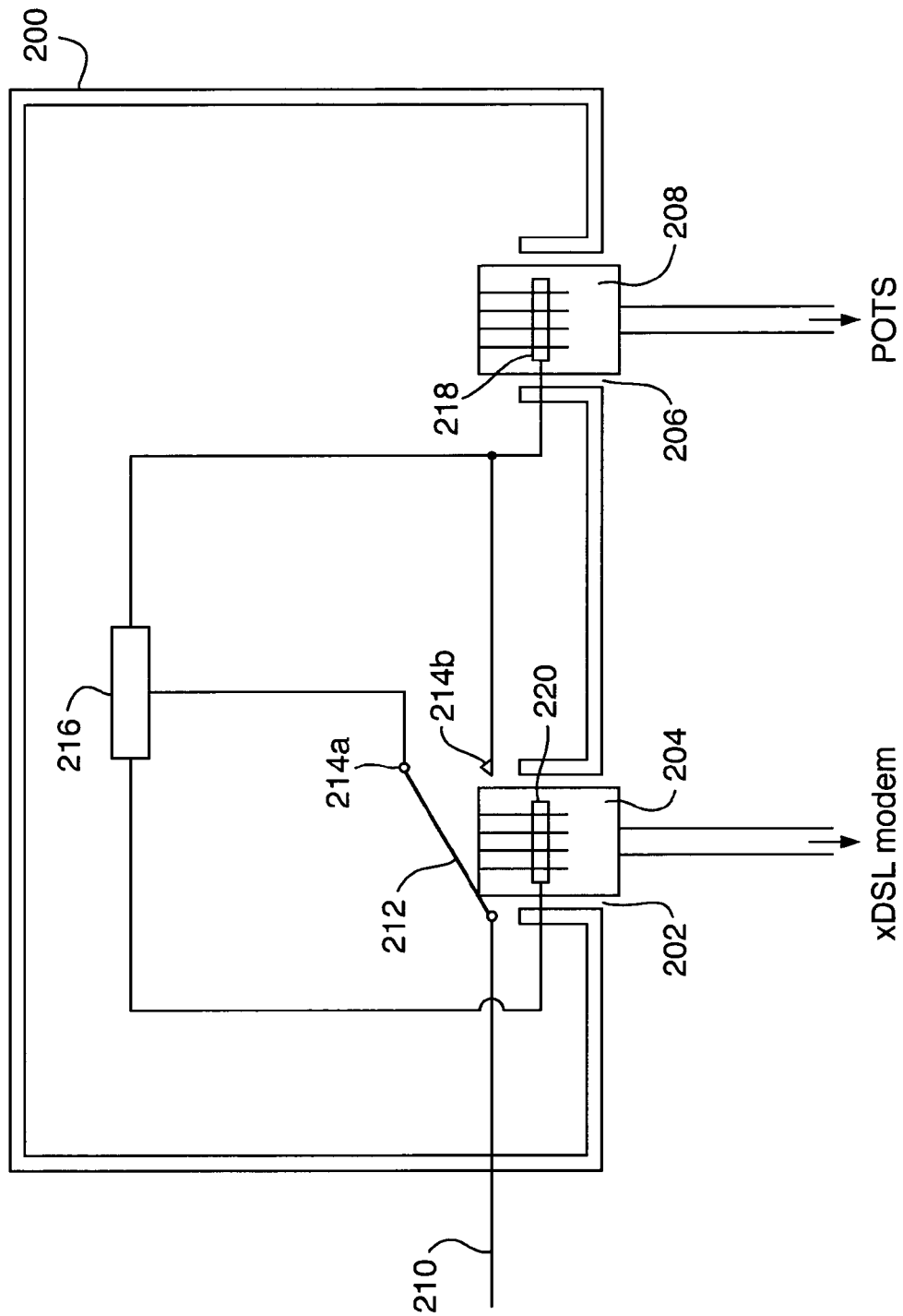
FIG. 2 is a schematic illustrating an embodiment of the present invention in a first mode of operation.

FIG. 2 shows a network termination device 200 in an embodiment. The device 200 is an adapted service specific front plate. The device is adapted for use with VDSL2 data communications as well as POTS. The device 200 has two sockets 202 and 206. Socket 202 is a data socket for use with VDSL2 or other xDSL communications. The socket 202 can accept a data connector 204, such as an RJ 11 plug that can be used to connect to a VDSL2 modem or router. Socket 206 is a phone/extension socket for POTS services, and can accept a standard phone connector plug 208 used to connect to standard telephones or to connect to further extension sockets. In the UK, this phone connector is usually using a BT 431 A socket connector. In Europe, this is usually an RJ-11 connector. Device 200 also includes a signal line 210 from the telephone exchange (central office). This signal line 210 includes both voice and data signals. In the UK telephone wiring has 6 pins, where pins 2 and 5 are used to carry telephone signals over a "copper pair". Thus, whilst the examples show only one signal line, it will be appreciated that this signal line represents the two physical wires connected over pins 2 and 5, but has been reduced to a single line in the figures and description for the sake of simplicity and clarity.

In the device 200, the signal line 210 is connected to a sprung return micro switch 212. The connection between the signal line 210 and the micro switch 212 can include some intermediary connector not shown. The micro switch 212 toggles between two output connections 214a and 214b depending on whether it is activated by a connector 204 inserted into the data socket 202. When a data connector 204 is presented into the data socket 202, the micro switch 212 is activated, and a connection is made with output 214a and onto the filter 216. Thus, when a connector 204 is inserted into the data socket 204, the signal line 210 is connected, through the micro switch 212 and connection 214a, to the filter 216.

The micro switch 212 can be activated by the insertion of the data connector 204 depressing an actuator element or similar of the micro switch 212.

The filter 216 splits and filters the signal originating from the signal line 210, such that low frequency voice components pass to the connection 218 in the phone socket 206, and high frequency xDSL data components passed to connection 220 in the data socket 220. Thus, the phone socket 206, by way of connection 218, will receive low pass filtered voice components only from the signal line 210, whereas the data socket, by way of connection 220, will receive only high frequency data components of the signal line 210. Therefore, the presence of the data connector 204 in the data socket 202 causes the micro switch to activate and thus bring the filter 216 in-line with the signal line to filter the signal.

In one embodiment, the filter 216 is a low pass filter located between the connection 214a and the phone socket connection 218, which filters out all high frequency components output at the phone socket 208 (by way of the connection 218).

The phone socket 206, or the wiring from the filter to the phone socket 206, can also be connected to further phone extension sockets (not shown), which are common in customer premises providing phone connectivity to other locations in the premises. Thus, any connected phone extensions will also benefit from the filtering provided by the device 200.

In contrast, when there is no connector 204 inserted into the data socket 202, the micro switch 212 is not activated, and the signal line 210 is connected to output connection 214b and consequently directly onto connection 218 of the phone socket 206 only (and thus bypassing the filter 216). This is illustrated in FIG. 3, which is similar to FIG. 2, but shows the micro switch 212 in a closed, de-activated, position. As no filtering is done to the signal line 210, the phone socket 206 (by way of connection 218) is presented with the combined voice and data signals present on the signal line 210. Any extension wiring connected by way of the phone socket 206 will also be presented with unfiltered, combined voice and data signals. Furthermore, no signal is presented to the socket 202 as the signal has not been split by the filter 216.

In summary, the presence of the micro switch 212 at the data socket 202 serves to bring the filtering components 216 in-line with the signal wiring only when a data connector plug 204 is inserted into the data socket 202. When no data plug 204 is presented into the data socket, the signals are not subject to the filter 216, and thus the output at the phone socket 206 and any extension sockets will include all signals unfiltered, so both voice and data signals.

Figure 1:
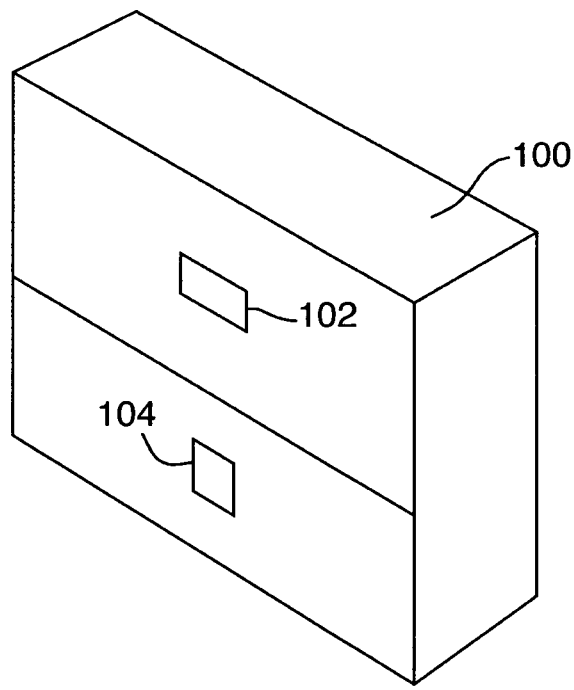
FIG. 1 is an example of a service specific front faceplate.

The device 200 can be implemented in a face plate similar to that of the VDSL SSFP 100 shown in FIG. 1. In particular, the device 200 can be located as part of a face plate 100, where the data socket 202 corresponds to the data port 104, and the phone socket 206 corresponds to telephony port 102.

A skilled person will appreciate that other switching mechanisms are possible, as long as they can switch out the filter 216 when no data plug 204 is presented to the data socket 202, and can switch in the filter 206 when a data plug 204 is presented to the data port 202.

Furthermore, whilst a phone socket 206 has been shown in the examples of the device 200 above, in an alternative embodiment, the phone socket 206 can be replaced by extension wiring alone to phone extension sockets that will ultimately terminate with a phone socket. The important feature is that a phone connection of some sort, be it directly at a phone socket 206 in the device 200 or at some extension socket, is provided for phone output that is filtered in dependence on the presence a data connector 204 in the data socket 202.

In general, it is noted herein that while the above describes examples of the invention, there are several variations and modifications which may be made to the described examples without departing from the scope of the present invention as defined in the appended claims. One skilled in the art will recognize modifications to the described examples.

The invention claimed is:

1. A telecommunications filter device located at a customer premise for filtering a telecommunications signal comprising telephony signals and data signals, the device comprising:
 a single housing;
 a data signal port integral to the single housing;
 a telephony signal output;
 a switch disposed internal to the single housing and positioned proximate to the data signal port, the switch adapted to operate in a first mode and a second mode, the first mode activated when a data plug is presented to the data signal port, and the second mode activated when no data plug is presented to the data signal port; and
 a filter disposed internal to the single housing;
 wherein, in the first mode the telecommunications signal is filtered by the filter to output filtered telephony signals to the telephony signal output, and in the second mode the telecommunications signal is not filtered and both telephony and data signals are output to the telephony signal output.

2. A telecommunications filter device as claimed in claim 1, wherein the device comprises a telephony port, and the telephony signal output is connected to the telephony port.

3. A telecommunications filter device as claimed in claim 1, wherein the telephony signal output is connected to at least one telephone extension socket.

4. A telecommunications filter device as claimed in claim 1, wherein the filter is a low pass filter and in the first mode the telecommunications signal is filtered by the filter between the switch and the telephony signal output.

5. A telecommunications filter device as claimed in claim 1, wherein the data signals comprise xDSL signals, and the telephony signals comprise voice signals.

6. A telecommunications filter device according to claim 5, wherein the data signals are transmitted at a higher frequency than the telephony signals.

7. A telecommunications filter device as claimed in claim 1, wherein the single housing is a service specific front plate.

8. A telecommunications filter device as claimed in claim 1, wherein the data signal port and the telephony signal output are constituent elements of the single-housing.

* * * * *